(12) United States Patent
Ham

(10) Patent No.: US 6,628,453 B2
(45) Date of Patent: Sep. 30, 2003

(54) QUANTUM SWITCH

(75) Inventor: Byoung-Seung Ham, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 226 days.

(21) Appl. No.: 09/846,794

(22) Filed: May 1, 2001

(65) Prior Publication Data

US 2002/0015205 A1 Feb. 7, 2002

(30) Foreign Application Priority Data

Jun. 19, 2000 (KR) .......................... 2000-33724

(51) Int. Cl.[7] .............................. G02F 1/355; G02F 6/35
(52) U.S. Cl. ......................................... 359/326; 385/16
(58) Field of Search ............................. 359/326–332; 385/16

(56) References Cited

U.S. PATENT DOCUMENTS

| 5,552,735 A | * | 9/1996 | Kang et al. | 327/367 |
| 5,771,117 A |  | 6/1998 | Harris et al. | 359/326 |
| 2002/0021474 A1 | * | 2/2002 | Ham | 359/181 |

OTHER PUBLICATIONS

Ham, "Quantum Switching Based On The Dark Resonance", 2000 International Quantum Electronics Conference Digest, p. 199, Sep. 2000.*
Ham et al, "Coherence Switching In A Four–Level System: Quantum Switching", Physical Review Letters, vol. 84, No. 18, May 2000, pp. 4080–4083.*
"Potential Applications of Dark Resonance to Subpicosecond Optical Switches in Hyper–Terahertz Repetition Rates", Byoung S. Ham, Applied Physics Letters, May 28, 2001, vol. 78, No. 22, pp. 3382–3384.
Efficient phase conjunction via two–photon coherence in an optically dense crystal; B.S. Ham et al.; Rapid Communications, Apr. 1999, vol. 59, No. 4.
Coherence switchings in a four–level system: quantum switching; B. S. Ham et al. Physical Review Letters vol. 84, No. 18, May 1, 2000.
Nonlinear Optical Processes Using Electromagnetically Induced Transparancy; S.E. Harris et al. Physical Review Letters vol. 64, No. 10, Mar. 5, 1990.
Enhanced nondegenerate four–wave mixing owing to electromagnetically induced transparancy in a spectral hole–burning crystal; B.S. Ham et al. Optical Letters vol. 22, No. 15, Aug. 1997, pp. 1138–1140.

* cited by examiner

Primary Examiner—John D. Lee
(74) Attorney, Agent, or Firm—Blakely, Sokoloff, Taylor & Zafman

(57) ABSTRACT

A system, method, and apparatus for optical switches based on dark resonance in which three-color lasers interact with a four-level nonlinear optical medium composing three ground states and an excited state through nondegenerate four-wave mixing processes. The switching mechanism is based on dark resonance induced two-photon coherence swapping among the three closely spaced ground states through optical transitions via an excited state. The two-photon coherence induced on the ground states is optically detected via nondegenerate four-wave mixing processes. The nondegenerate four-wave mixing generation is enhanced owing to dark resonance or electromagnetically induced transparency. The switching time and bandwidth of the present optical switching method is not limited by population relaxation time or carrier's lifetime. More advantage is given by signal amplifications owing to the dark-resonance enhanced nondegenerate four-wave mixing processes.

20 Claims, 7 Drawing Sheets

QUANTUM SWITCH

FIELD OF THE INVENTION

The present invention relates to a method and an apparatus for optical switches based on a dark resonance induced two-photon coherence swapping.

DESCRIPTION OF THE PRIOR ART

An optical switch is generally used to drop, add, multiplex, convert to different frequencies, or route a data in fiber optic communications. As data traffic increases, the bandwidth of the optical switch is needed to be wider. Several optical switching methods have been developed for semiconductor-optical-amplifier (SOA) based optical switches utilizing resonance transitions of the medium and polymer based optical switches utilizing nonresonance transitions of the medium. These optical switches are based on refractive index change induced by applied electric current. In these switching methods, the time needed for the refractive index change is absolutely constraint of the switching time. Here, the refractive index change is restricted by carriers' redistribution time for the resonance transitions such as in the SOA-based optical switching method. The refractive index change based on the resonance transitions is more efficient than the method based on the nonresonance transitions, even though the switching time for the resonance transitions is a limiting factor. Therefore, the switching time is fundamentally limited by the carriers' lifetime in the optical switching technologies based on the resonance transitions, so that ~10 GHz is the upper limit of the switching bandwidth in heterostructures of semiconductors.

On the other hand, it is well known that two-color electromagnetic fields can induce refractive index change in a nonlinear optical medium composing three energy levels. The energy level structure of the optical medium can be two-closely spaced ground states and an excited state, or two-closely spaced excited states and a ground state, or arbitrarily spaced states. The refractive index change is induced to either the optical transition of the medium or to the closely spaced level transition via two-photon resonance of the applied electromagnetic fields. This refractive index change can result in absorption cancellation at line center, while strong coherence is induced on the closely spaced states. This phenomenon is called dark resonance or electromagnetically induced transparency (EIT) in the context of optically dense medium. Here, the origin of the dark resonance is the existence of dark state, which is a coherent superposition state, composed of the two-closely spaced ground states.

In the case of dark resonance or EIT, the time needed for the refractive index change is, however, not limited by the carriers' lifetime or population relaxation time, but may be limited by the phase decay time. Generally, the phase decay time is faster than the carrier's lifetime at least twice in most atomic gases and hundreds times in most ion-doped crystals such as $Pr^{3+}$ doped $Y_2SiO_5$. The detection of the two-photon coherence induced on the closely spaced ground states is optically made by nondegenerate four-wave mixing processes. The optical intensity of the generated nondegenerate four-wave mixing signal can be stronger than that of the original input laser. This signal amplification in the nondegenerate four-wave mixing processes based on dark resonance was already demonstrated experimentally in atomic vapors and ion-doped solids.

Now, suppose that the nonlinear optical medium has four energy levels composing closely spaced three-ground states and an excited state. When three-color electromagnetic fields interact with the four-level optical system, however, the optical medium can experience disruption on the induced refractive indices. The two-photon coherences induced on the ground states can, therefore, be controlled by a third laser field. This phenomenon produces two-photon coherence swapping among the three ground states when all three lasers interact with the optical system. Of course, the two-photon coherence induction can be optically detected via the nondegenerate four-wave mixing processes. Therefore, an entirely different all-optical switching method whose switching bandwidth is not limited by the population decay time or carrier's life time can be achieved when the dark resonance phenomenon is used in a four-level optical medium interacting with three-color lasers.

SUMMARY OF THE INVENTION

It is, therefore, an object of the present invention to provide a method of an optical switch based on dark resonance or EIT, where the switching mechanism is based on the quantum coherence swapping produced by three-color lasers interacting with a four-level optical medium, and the switching bandwidth is not limited by the population relaxation time or carrier's lifetime.

It is another object of the present invention to provide a quantum switch, wherein the optical switching is based on dark resonance.

It is another object of the present invention to provide a method and apparatus of the quantum switch for all-optical field driving, ultrawide bandwidth, parallel processing, time- and space-division superimposed, signal amplifiable, and line narrowed switching device.

In accordance with one aspect of the present invention, there is provided a method of quantum switch using a nonlinear optical medium composing three closely spaced ground states |a>, |b> and |c> such that the transition among the ground states is dipole forbidden, and an excited state |d> such that two-photon transitions between the ground state |a> and the |c>, the |b> and the |c>, and the |a> and the |b> via the excited state |d> are allowed, the method comprising following steps: applying a first laser beam to the nonlinear optical medium as an input beam through an optical fiber, waveguide, or free space at a frequency of $\omega_1$ corresponding to a first transition between the ground state |a> and the excited state |d>; applying a second laser beam to the nonlinear optical medium through an optical fiber, waveguide, or free space at a frequency of $\omega_2$ corresponding to a second transition between the ground state |b> and the excited state |d>; applying a third laser beam to the nonlinear optical medium through an optical fiber, waveguide, or free space at a frequency of $\omega_3$ corresponding to a third transition between the ground state |c> and the excited state |d>; adjusting the intensities of the first laser beam $\omega_1$, the second laser beam $\omega_2$, and the third laser beam $\omega_3$ to produce a strongly driven superposition state composed of the ground state |a> and the |c> creating two-photon coherence induction $Re\rho_{ac}$; adjusting the frequency of the first laser beam $\omega_1$ to produce a strongly driven superposition state composed of the ground state |b> and the |c> creating two-photon coherence induction $Re\rho_{bc}$, whereas making the two-photon coherence induction $Re\rho_{ac}$ suppressed; applying a fourth laser beam $\omega_p$ through an optical fiber or a free space corresponding to a fourth transition between the ground state |c> and the excited state |d> for nondegenerate four-wave mixing or phase conjugation geometry with either the first laser beam $\omega_1$, the $\omega_3$, and the $\omega_p$ to produce nondegenerate four-wave mixing signal $\omega_{1d}$, or the second laser beam $\omega_2$, the $\omega_3$, and the $\omega_p$ to produce nondegenerate four-wave mixing signal $\omega_{2d}$; and connecting the nondegenerate four-wave mixing signals $\omega_{1d}$ and the $\omega_{2d}$ to optical fibers physically separated.

In accordance with one aspect of the present invention, there is provided an apparatus for quantum switch using a nonlinear optical medium composing three ground states |a>, |b>, |c> such that the transition between the ground states |a> and |b>, |a> and |c>, and |b> and |c> are dipole forbidden, and an excited state |d> such that two-photon transition between the ground states |a> and |b>, |a> and |c>, and |b> and |c> via the excited state |d> is allowed, the apparatus comprising: an input beam source for applying to the nonlinear optical medium the input beam at a frequency of $\omega_1$ corresponding to a first transition between the ground state |a> and the excited state |d>; a second laser beam source for applying to the nonlinear optical medium a second beam at a frequency of $\omega_2$ corresponding to a second transition between the ground state |b> and the excited state |d>; a third laser beam source for applying to the nonlinear optical medium a third beam at a frequency of $\omega_3$ corresponding to a third transition between the ground state |c> and the excited state |d>; means for splitting a fourth laser beam from the third laser beam for applying to the nonlinear optical medium the fourth beam at a frequency of $\omega_p$ corresponding to a fourth transition between the ground state |c> and the excited state |d>; and means for adjusting the intensities and the frequencies of the first beam, the second beam, the third beam, and the fourth beam to produce coherent superposition states of the ground state |a> and the |b>, the |a> and the |c>, and the |b> and |c>.

In accordance with one aspect of the present invention, there is provided a method for implementing a quantum switch, comprising the steps of: applying a plurality of light beams to a nonlinear optical medium, each of the light beams having a frequency corresponding to one of transition frequencies of the nonlinear optical medium; and inputting a pumping light beam to produce nondegenerate multi-wave mixing signals based on a dark resonance, wherein the pumping light beam has a frequency corresponding to a transition between an excited state and a ground state which has one of the ground states of the nonlinear optical medium.

In accordance with one aspect of the present invention, there is provided an optical device, comprising: a nonlinear optical medium including a number of energy levels; a light source for inputting a plurality of lights to the nonlinear optical medium, each of the lights having a frequency corresponding to one of transition frequencies of the nonlinear optical medium; and a pumping source for inputting a pumping light into the nonlinear optical medium, whereby the pumping light produces nondegenerate multi-wave mixing signals based on a dark resonance.

BRIEF DESCRIPTION OF THE DRAWINGS

The above and other objects and features of the present invention will become apparent from the following description of the preferred embodiments given in conjugation with the accompanying drawings, in which.

DESCRIPTION OF THE PREFERRED EMBODIMENTS

Figure 1:
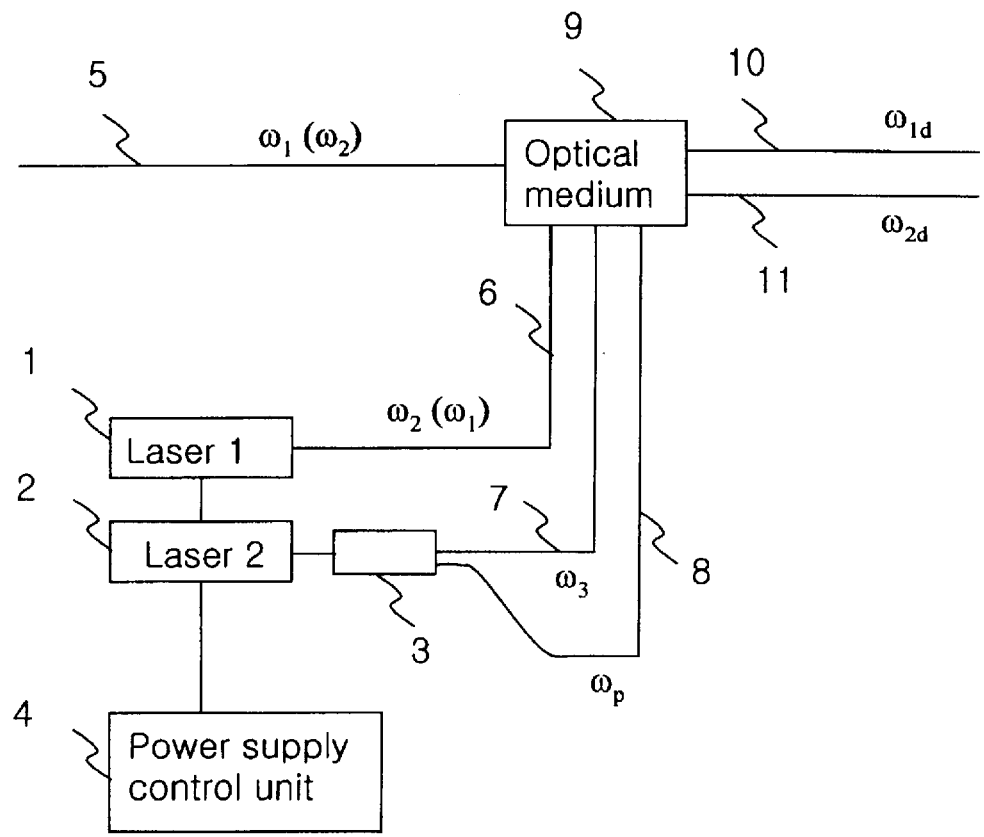
FIG. 1 illustrates a schematic diagram of the present invention.
Figure 2:
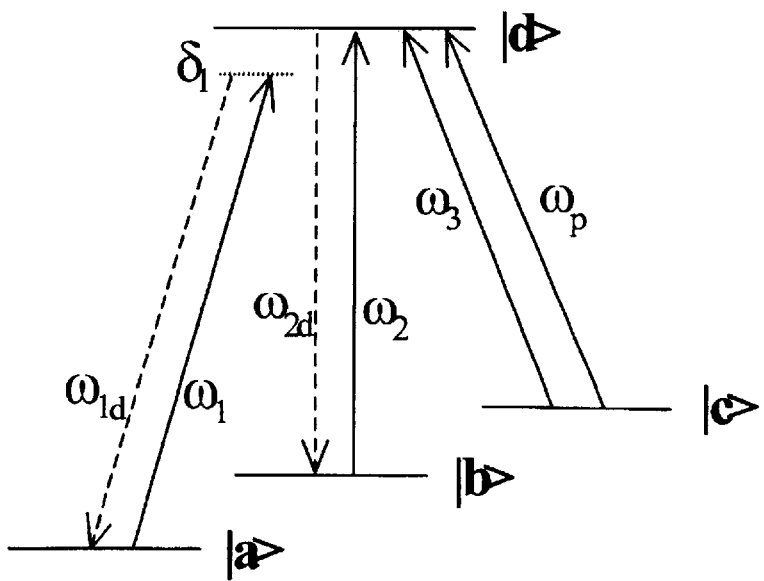
FIG. 2 shows an energy-level model of the nonlinear optical medium 9 of FIG. 1, where the frequency difference among the ground states are much smaller comparing with the transition frequency between the ground and the excited states.

To gain a better understanding reference is now made to the drawings, which illustrate the preferred embodiments of the invention. Referring to FIG. 1, the system of the present invention is shown. The main component of the system is composed of four laser inputs 5 through 8, nonlinear optical medium 9, and two light outputs 10 and 11. The laser sources are connected to the nonlinear optical medium 9 by either fibers or free space through optics such as mirrors. The lasers, 1, and 2 are controlled by the power supply control unit 4. The power supply unit 4 is synchronized to the laser input signal 5 so that all the four laser inputs 5 through 8 are coherent. The laser input 8 is split from the laser 2 by a fiber coupler 3 for a fiber transmission scheme or by a beam splitter (not shown in FIG. 1) for a free space transmission scheme. The laser input frequencies of 7, 8 are $\omega_3$ and $\omega_p$, respectively. The laser input frequencies of 5, 6 are $\omega_1$ and $\omega_2$, which are depending on applications to be discussed in detail in FIGS. 7 and 8. The energy level diagram of the nonlinear optical medium 9 of FIG. 1 is shown in FIG. 2. In general this kind energy level structure appears in rare-earth doped crystals such as $Er^{3+}$ doped $Y_2SiO_5$. Here, the lower three energy levels are formed from the hyperfine splitting in the case of rare-earth doped crystals. The energy level structures of FIG. 2 can also be made artificially by multiply coupling semiconductor quantum wells and barriers. The nonlinear optical medium 9 of FIG. 1 has four energy states |a>, |b>, |c> and |d>. The state |d> is higher than |a> and |c>, |c> is higher than |b>, and |b> is higher than |a> in energy, as shown in FIG. 2.

Realistically, the nonlinear optical medium 9 should have more energy levels, but the energy levels only shown in FIG.

2 contribute to the quantum switching mechanism of the present invention. The $\delta_1$ of FIG. 2 is a detuning of $\omega_1$ from the resonance frequency from $|a>$ to $|d>$, i.e., $\delta_1=\omega_{da}-\omega_1$ where $\omega_{da}=\omega_d-\omega_a$. The laser output $\omega_{2d}$ is generated by nondegenerate four-wave mixing processes involving three laser interactions of $\omega_2$, $\omega_3$, and $\omega_p$ with the nonlinear optical medium. Similarly, the laser output $\omega_{1d}$ is generated by nondegenerate four-wave mixing processes involving three laser interactions of $\omega_1$, $\omega_3$, and $\omega_p$ with the medium. The propagation directions $k_{1d}$ and $k_{2d}$ of the nondegenerate four-wave mixing signals $\omega_{1d}$ and $\omega_{2d}$ of FIG. 2 are determined by the phase matching conditions, respectively: $k_{1d}=k_1-k_3+k_p$; $k_2=k_{2d}-k_3+k_p$. Here, the nondegenerate four-wave mixing generation is strongly enhanced owing to dark resonance or EIT. To understand the enhancement of the nondegenerate four-wave mixing processes, more detail explanation is presented below.

Enhancement of nondegenerate four-wave mixing processes is suggested by Harris in Physical Review Letters, Vol. 64, pp. 1107–1110 (1991) and are demonstrated experimentally in atomic gases by Jain et al. in Optics Letters Vol. 18, pp. 998–1000 (1993) and in ion-doped solid by Ham et al. in Optics Letters, Vol. 22, pp. 1138–1140 (1997), which are incorporated herein by reference. Signal amplifications and high-conversion efficiency using atomic gases in the nondegenerate four-wave mixing processes were experimentally demonstrated by Hemmer at al. in Optics Letters, Vol. 20, pp. 982–984 (1995) and Jain et al. in Physical Review Letters, Vol. 77, pp. 4326–4329 (1996), respectively, which is incorporated herein by reference. The high-conversion efficiency of the nondegenerate four-wave mixing processes was also experimentally demonstrated in ion-doped solids by Ham et al. in Physical Review A, Vol. 59, pp. R2583–2586 (1999), which is incorporated herein by reference. The enhancement of nondegenerate four-wave mixing processes is based on reduced first-order linear susceptibility and increased third-order nonlinear susceptibility owing to destructive and constructive quantum interference, respectively.

To show more detail relations between the laser inputs and nondegenerate four-wave mixing signals, coherence change should be examined. To see the coherence excitation in FIG. 1, density matrix $\rho$ is discussed. Density matrix is a useful tool to see system's macroscopic ensemble; Quantum optics, Cambridge University Press, New York, N.Y. (1997) Ed. Scully and Zubairy, which is incorporated herein by reference. The density matrix $\rho$ is denoted by a state function $\Psi$:

$$\rho = |\Psi\rangle\langle\Psi| \qquad (1)$$

$$|\Psi\rangle = \sum_i a_i(t)\exp(-i\varepsilon_i t/\eta)|u_i\rangle. \qquad (2)$$

where $\epsilon_I$ is an amplitude of an applied field.

In FIG. 1, two laser inputs $\omega_2$ and $\omega_3$ induce two-photon coherence $\rho_{bc}$ on the transition $|b>-|c>$. Similarly two lasers $\omega_1$ and $\omega_3$ induce two-photon coherence $\rho_{ac}$ on the ground state transition $|a>-|c>$ via the excited state $|d>$. Especially, the two-photon coherence is strongly increased when the dark resonance or electromagnetically induced transparency (EIT) involves. Here, the dark resonance or the EIT is the same physical phenomenon, but the term EIT roots in the absorption cancellation when a resonant electromagnetic field pass through an optically thick medium, so that the resonant light can pass through without experiencing any absorption.

Figure 3A:
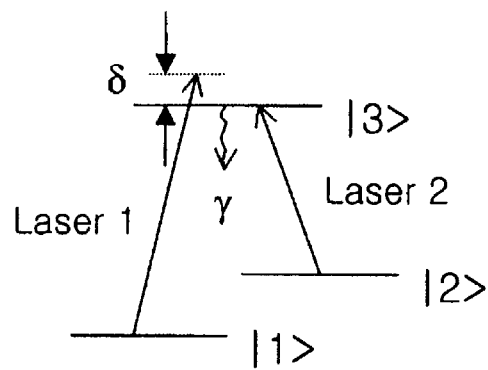
FIGS. 3A to 3C show refractive index changes based on dark resonance in a three-level system interacting with two-color lights.
Figure 3B:
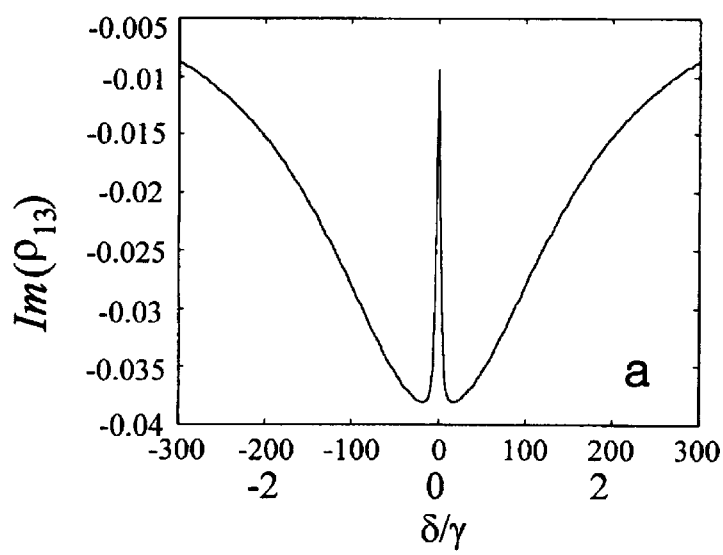
Figure 3C:
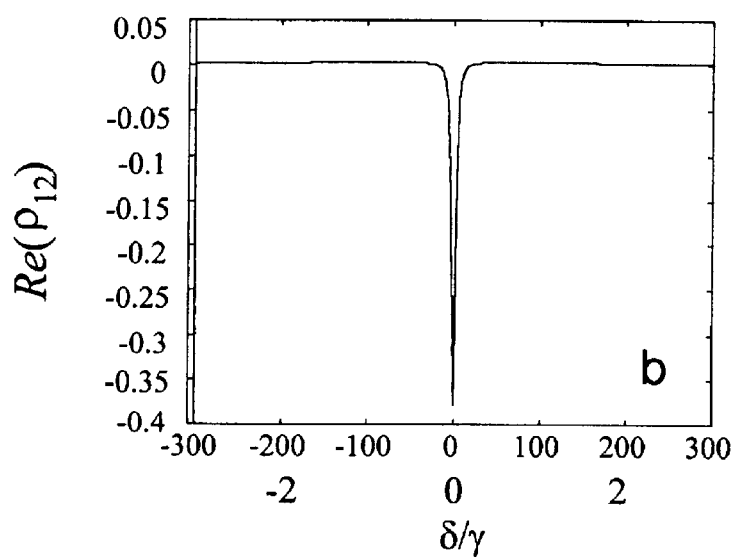

FIGS. 3A to 3C show refractive index changes induced by dark resonance in a three-level system interacting with two lasers. As seen in FIGS. 3A to 3C, the two-photon coherence $\text{Re}\rho_{12}$ is strongly dependent on the absorption change of $\text{Im}\rho_{13}$ at line center. The two-photon coherence $\text{Re}\rho_{12}$ is optically detected via nondegenerate four-wave mixing processes as mentioned above. The relationship between the enhanced nondegenerate four-wave mixing signal $I(\omega_d)$ and the two-photon coherence $\text{Re}\rho_{12}$ is as follows: $I(\omega_d)$ $[\text{Re}\rho_{12}]^2$. This relation was experimentally demonstrated by Ham et al. in Physical Review A, Vol. 59, R2583–R2586 (1999), which is incorporated herein by reference.

Figure 4:
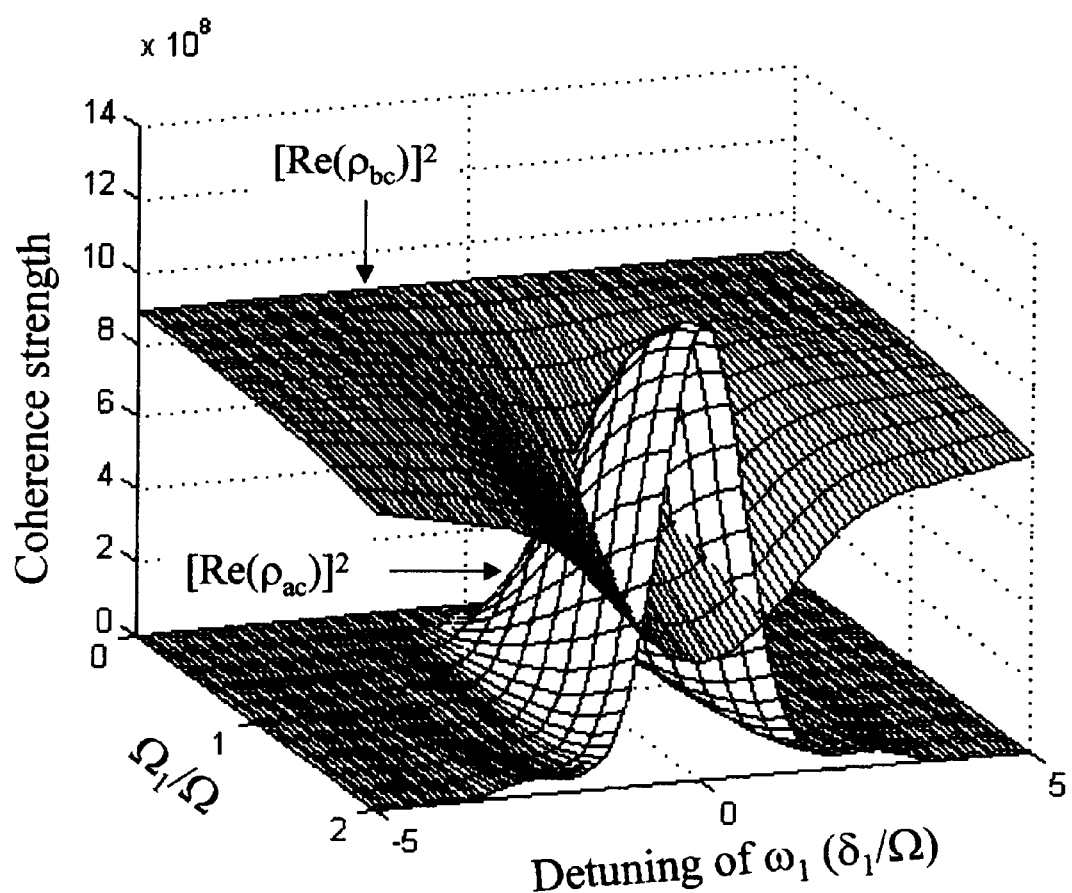
FIG. 4 illustrates two-photon coherence induced on the ground states |a>, |b>, and |c> of FIG. 2 by the atom-field interactions.

To demonstrate the two-photon coherence swapping induced by the laser inputs $\omega_1$, $\omega_2$, and $\omega_3$ on the three-ground states $|a>$, $|b>$, and $|c>$ of FIG. 2, density-matrix rate equations are solved for a short time interaction of 1 ps. The Rabi frequency $\Omega$ of the $\omega_2$ and $\omega_3$ is set to be same each other. FIG. 4 is a graph of numerical calculations of the density matrix equations obtained from the following relation (7). For the calculations a closed four-level system is assumed; $\rho_{11}+\rho_{22}+\rho_{33}+\rho_{44}=1$. At line center of the laser $\omega_1$, the two-photon coherence strengths of $\text{Re}\rho_{ac}$ and $\text{Re}\rho_{bc}$ are swapped each other when the Rabi frequency $\Omega_1$ of the laser $\omega_1$ is greater than the $\Omega$. Similarly, the two-photon coherence swapping also occurs at off-detuning $\delta_1$ when the Rabi frequency $\Omega_1$ of the $\omega_1$ exceeds $\Omega$. Now, the two-photon coherence induction on the ground states is optically detected via nondegenerate four-wave mixing processes as mentioned above. Therefore, an entirely different optical switching mechanism is obtained by using the two-photon coherence swapping based on dark resonance or EIT. The density matrix rate equations are got from the following relations. The Hamiltonian H based on the light matter interactions in FIG. 2 is $$H = -\frac{\eta}{2}\begin{bmatrix} -2\delta_1 & 0 & 0 & \Omega_1 \\ 0 & -2\delta_2 & 0 & \Omega_2 \\ 0 & 0 & -2\delta_3 & \Omega_3 \\ \Omega_1 & \Omega_2 & \Omega_3 & 0 \end{bmatrix}, \qquad (3)$$

where $\delta_1=\omega_1-\omega_{ad}$, $\delta_2=\omega_2-\omega_{bd}$, $\delta_3=\omega_3-\omega_{cd}$, $\Omega_1(i=1,2,3)=\mu E_1/2\pi h$ $i=1,2,3)$, and h and • are Planks constant/2• and matrix element, respectively. Here $E_I(r,t)$ can be denoted by:

$$E_i(r,t)=\tfrac{1}{2}\epsilon_i(t)\exp\{(\omega_i t-k\cdot r)\}+c.c., \qquad (4)$$

Shrödinger equation is $$|\emptyset \&\rangle = -\frac{i}{\eta}H|\emptyset\rangle. \qquad (5)$$

From the Shrödinger equation, the density matrix rate equation is obtained as follows:

$$\dot{\rho} = -\eta[H,\rho] + \text{(decay terms)}. \qquad (6)$$

Therefore, the time dependent density matrix equation is $$¥\&n_{ij} = -\frac{i}{\eta}\sum_k\left(H_{ik}¥\tilde{n}_{kj} - ¥\tilde{n}_{ik}H_{kj} - \frac{1}{2}\left(\gamma_{ik}¥\tilde{n}_{kj} + ¥\tilde{n}_{jk}\overset{20}{\gamma_{kj}}\right)\right). \qquad (7)$$

From the above equations total 16-density matrix equations are obtained for k=3 of FIG. 2.

Figure 5A:
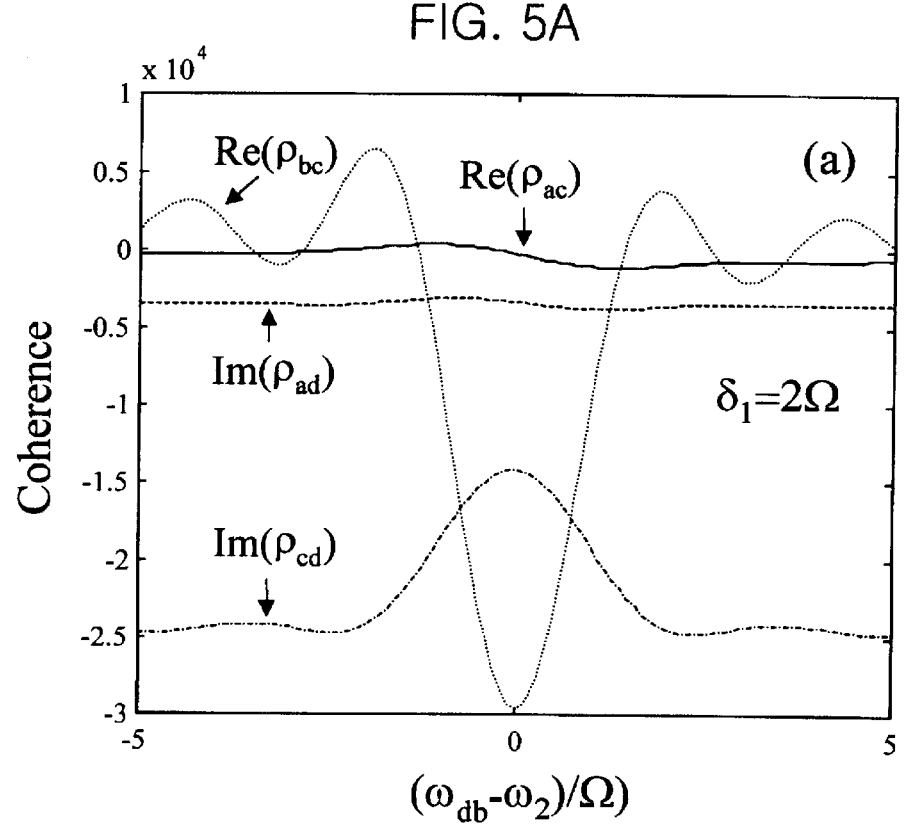
FIG. 5A is a plot of real and imaginary part of the coherence as a function of detuning frequency of the center laser field $\omega_2$ of FIG. 2.
Figure 5B:
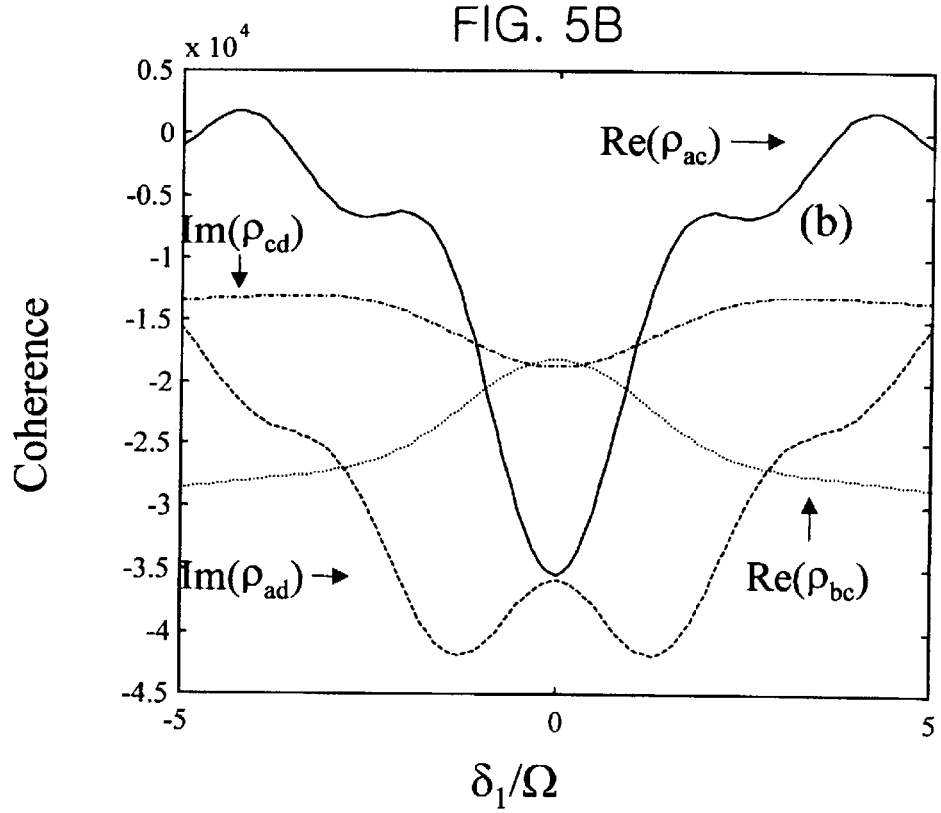
FIG. 5B is a plot of real and imaginary part of the coherence as a function of detuning frequency of the left laser field $\omega_1$ of FIG. 2.

To see the two-photon coherence swapping in more detail, the relation between two-photon coherence strengths $[\text{Re}\rho_{ac}]^2$ and $[\text{Re}\rho_{bc}]^2$ are compared with the absorption change denoted by $Im\rho_{ad}$ and $Im\rho_{cd}$ in FIG. 5. The graphs of FIG. 5 are obtained by solving the density matrix equations of the relation (7). In FIG. 5A, the two-photon coherence $Re\rho_{bc}$ induced by $\omega_2$ and $\omega_3$ of FIG. 2 is strongly increased at line center as the absorption $Im\rho_{cd}$ of the $\omega_3$ of FIG. 2 is reduced to near zero due to dark resonance when the detuning of $\omega_1$ of FIG. 2 is $\delta_1 = 2\Omega$. On the other hand the two-photon coherence $Re\rho_{ac}$ induced by $\omega_1$ and $\omega_3$ of FIG. 2 is strongly subsidized and the absorption $Im\rho_{cd}$ of the $\omega_3$ is enhanced at line center when the detuning of $\omega_1$ is $\delta_1 = 0$, while the two-photon coherence $Re\rho_{ac}$ is strongly enhanced and the absorption $Im\rho_{ad}$ of the $\omega_1$ is reduced (see FIG. 5B). From the graphs of FIG. 5, it is demonstrated that the two-photon coherence swapping between $Re\rho_{ac}$ and $Re\rho_{bc}$ is based on the dark resonance swapping between $Im\rho_{ad}$ and $Im\rho_{cd}$.

The demonstrations of two-photon coherence swapping for a short input pulse obtained in FIG. 5 can now be extended to the interactions with consecutive input pulses. To examine the two-photon coherence swapping for 16 consecutive input pulses, the density matrix equations are numerically solved in FIG. 6 for (a) $\delta_1 = 3\Omega$ and (b) $\delta_1 = 0$; $\delta_1$ is detuning of $\omega_1$ of FIG. 2, where $\delta_1 = \omega_{da} - \omega_1$ and $\omega_{da} = \omega_d - \omega_a$. The shape and length of the laser pulse is a square and 0.1 ps, respectively, as shown on top of each figure. The consecutive 16-input pulses stand for nonreturn-to-zero ASCII letters 'EN' in binary code format.

Figure 6A:
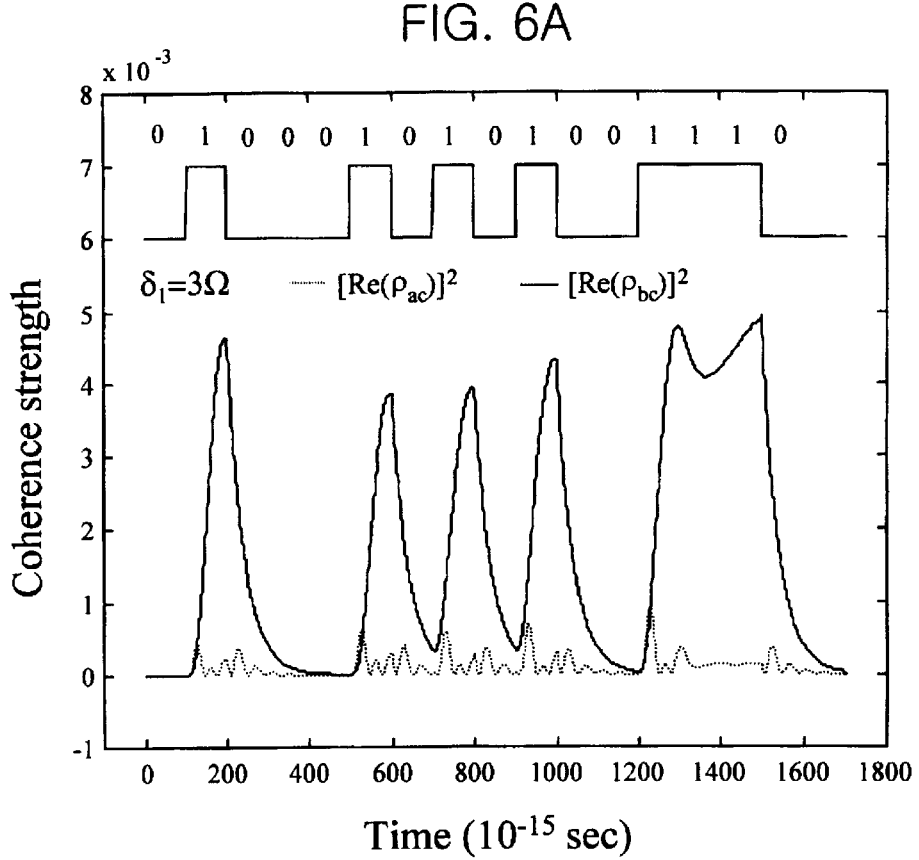
FIG. 6A is a plot of modulated two-photon coherence strength induced on the ground states |a>, |b>, and |c> of FIG. 2 when the detuning frequency of the left laser $\omega_1$ is $\delta_1 = 3\,\Omega$.
Figure 6B:
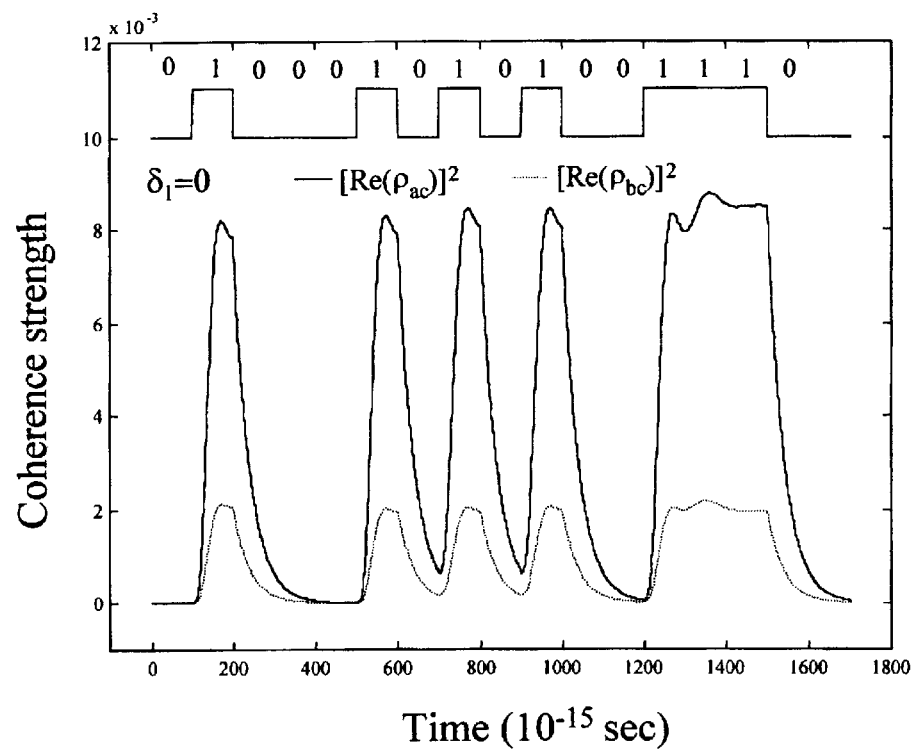
FIG. 6B is a plot of modulated two-photon coherence strength induced on the ground states |a>, |b>, and |c> of FIG. 2 when the detuning frequency of the left laser $\omega_1$ is $\delta_1 = 0$.

In FIG. 6A, the strength of the two-photon coherence 12 induced by the laser inputs 6 and 7 of FIG. 1 changes with high on/off ratio as fast as the input 5 of FIG. 1 varies, whereas the strength of the two-photon coherence 13 induced by laser inputs 5 and 7 of FIG. 1 is near zero whatever the input modulations are. On the other hand, in FIG. 6B, the strength of the two-photon coherence 13 induced by laser inputs 5 and 7 of FIG. 1 is modulated with high on/off ratio as fast as the input 5 of FIG. 1 modulates, whereas the strength of the two-photon coherence 12 induced by laser inputs 6 and 7 of FIG. 1 is near zero. Therefore, FIGS. 6A and 6B show that the two-photon coherence swapping based on dark resonance is switched as fast as the input signal modulates with 10-THz bandwidth.

Here, the parameters used in the calculations in FIG. 6 are the values of semiconductor optical constants, and the optical population decay time is set to be 1 ps. This fact demonstrates that the switching time and repetition rate of the dark resonance based quantum switch of the present invention is not limited by the carrier's life time, which is a critical switching limitation of current optical switching technologies (Nakamura et al., IEEE Photon. Technol. Lett. Vol. 10, pp. 1575–1577 (1998)), which is incorporated herein by reference. It should be also noted that there is trade-off between the two-photon coherence strength and the phase decay time of the ground states; As the phase decay time of the ground states gets faster, the two-photon coherence strength is reduced down. However, the fast phase decay time of the ground states enhances the repetition rate of the two-photon coherence swapping. In the calculations of FIG. 6, the ground-state phase-decay time is set to be ⅖ of the optical transitions.

Figure 7:
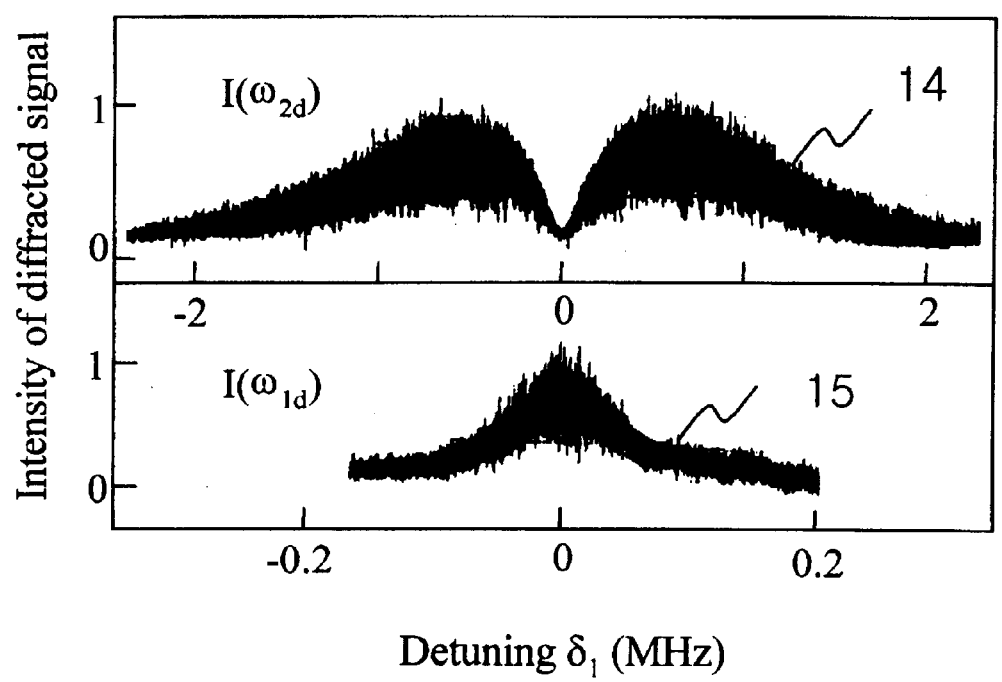
FIG. 7 is an experimental data of nondegenerate four-wave mixing signals $\omega_{1d}$ and $\omega_{2d}$ generated by the matter field interaction in FIG. 2.

FIG. 7 shows an experimental data of FIG. 2 obtained in continuous wave (cw) interactions with $Pr^{3+}$ doped $Y_2SiO_5$. For the experiments, hyperfine states of $^3H_4$ of $Pr^{3+}$ match the three-ground states of FIG. 2, and one of the hyperfine states of $^1D_2$ of $Pr^{3+}$ matches the excited state of FIG. 2. The crystal structure of the $Pr^{3+}$ doped $Y_2SiO_5$ was demonstrated by Maksimov et al. in Sov. Phys.—Doklady Vol. 13, pp. 1188–1190(1969), which is incorporated herein by reference. All laser inputs are cw. As discussed above the two-photon coherence is optically detected via nondegenerate four-wave mixing processes. One important note in FIG. 7 is that the frequency of the laser light $\omega_p$ of FIG. 2 should be detuned by the amount of the Rabi frequency of the $\omega_p$ to avoid interaction with degenerate four-wave mixing occurred between the $\omega_3$ and $\omega_p$ of FIG. 2. In FIG. 7 the diffracted signals 14 and 15 stand for nondegenerate four-wave mixing generations 11 and 10 of FIG. 1 as $\omega_{2d}$ and $\omega_{1d}$ of FIG. 2, respectively. Therefore, the experimental data of FIG. 7 demonstrates a pre-proof of the quantum switching of the present invention for a continuous wave scheme. Similar experiment of continuous wave two-photon coherence swapping was demonstrated by Ham et al. in Physical Review Letters, Vol. 84, pp.4080–4083 (2000), which is incorporated herein by reference.

Figure 8A:
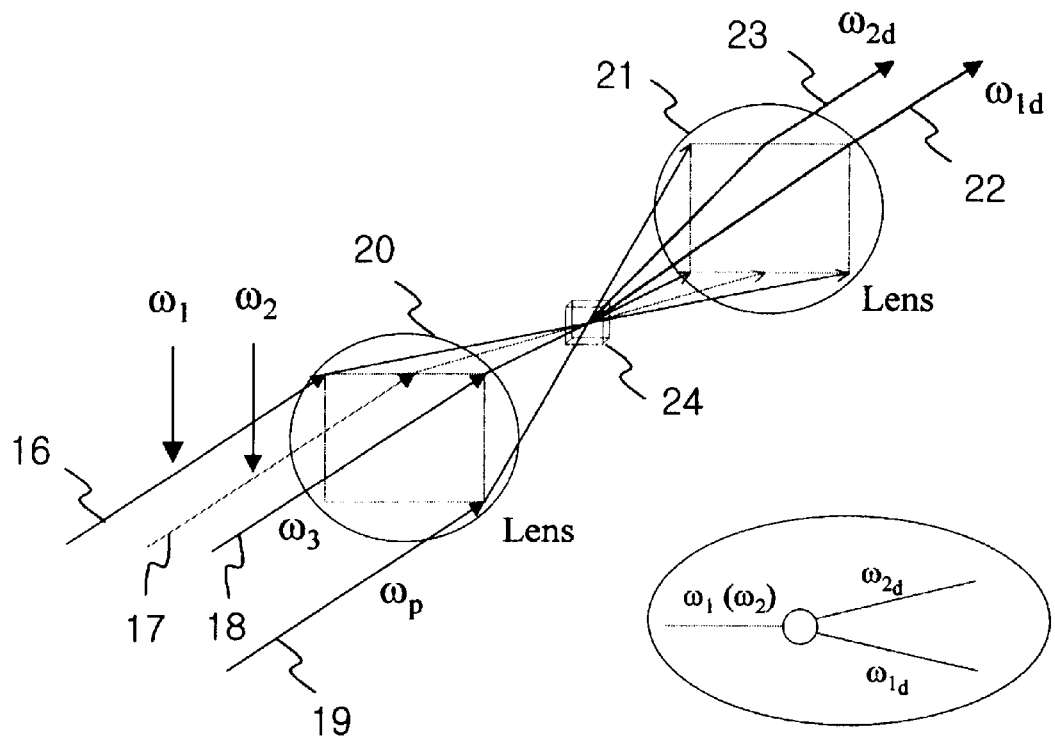
FIG. 8A illustrates a schematic diagram of the laser interaction with the nonlinear optical medium 9 of FIG. 1 for an all-optical quantum switch in a forward propagation scheme.
Figure 8B:
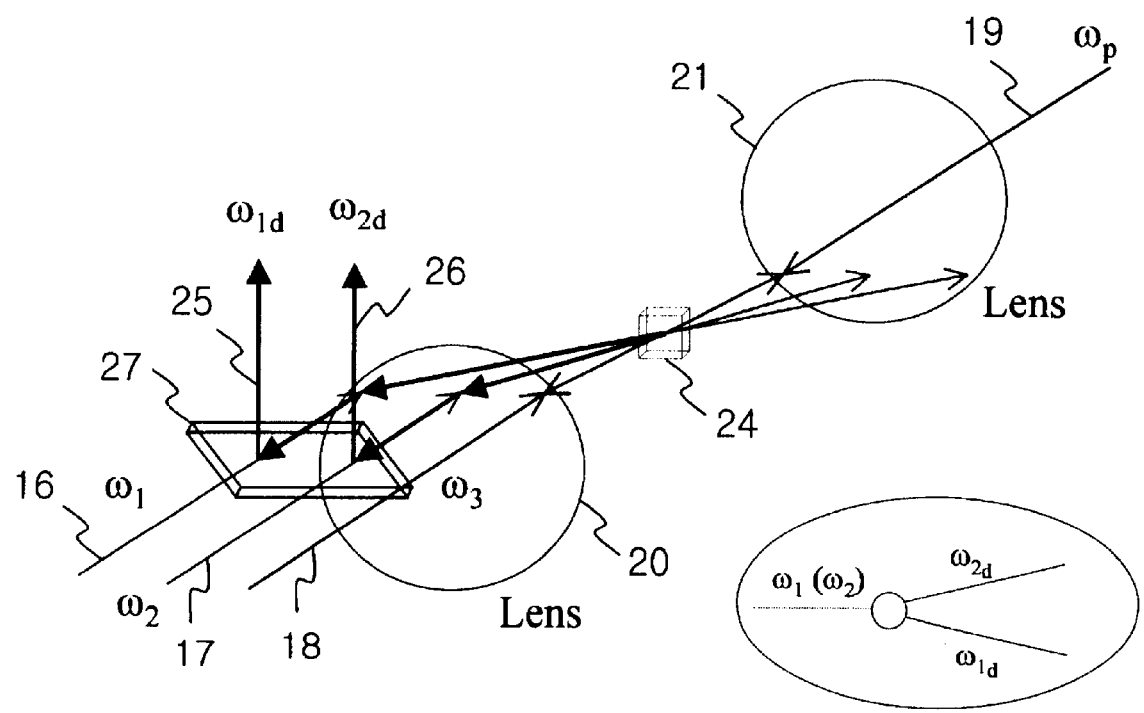
FIG. 8B illustrates a schematic diagram of the laser interaction with the nonlinear optical medium 9 of FIG. 1 for an all-optical quantum switch in a backward propagation scheme.

FIGS. 8A and 8B illustrate a specific apparatus of the present invention, the quantum switch. The four-laser inputs 16 through 19 of FIGS. 8A and 8B stand for laser inputs 5 through 8 of FIG. 1, respectively. The optical medium 24 of FIGS. 8A and 8B stand for the nonlinear optical medium 9 of FIG. 1. Lenses 20 and 21 of FIGS. 8A and 8B are used for focusing and collimating the input lasers, respectively. FIG. 8A is for a forward propagation scheme, and FIG. 8B is for a backward propagation scheme of phase conjugation. The directions of diffracted signals 22 and 23 of FIG. 8A should satisfy Bragg conditions made up with four-input lasers 16 through 19. The direction of the phase conjugates 25 and 26 of FIG. 8B should satisfy the phase matching conditions made up with the input lasers 16 through 19. In any case of either FIG. 8A or 8B, the diffracted signals or phase conjugates are back scattering free. Because the apparatus of the present invention is for pulsed laser input, all the laser pulses are synchronized. For the nondegenerate four-wave mixing processes in pulsed scheme, time delay is needed for the probe laser $\omega_p$. This time delay $\iota$ is to avoid unnecessary interactions with degenerate four-wave mixing processes produced by the laser lights $\omega_3$ and $\omega_p$. The amount of time delay $\iota$ should be shorter than phase decay time T2 of the transitions among the three ground states $|a\rangle$, $|b\rangle$, and $|c\rangle$.

Depending on specific applications the laser input 16 or 17 of FIGS. 8A and 8B is chosen to be switched. For the case of passive applications such as a demultiplexer of the quantum switch, the input 16 of FIGS. 8A and 8B should be 5 of FIG. 1. In this case, the input 16 of FIG. 8A is automatically switched into either the direction 22 or 23 by $\delta_1$ of FIG. 2, respectively. Here, the outputs 22 and 23 of FIG. 8A stand for 10 and 11 of FIG. 1, respectively. For the case of active applications such as an optical router of the quantum switch, the input 17 of FIGS. 8A and 8B should be 5 of FIG. 1. In this case, the input 16 of FIGS. 8A and 8B acts as a control, so that it can route the input 17 either into the direction of 22 or 23 by adjusting $\delta_1$ of the $\omega_1$ of FIG. 2. The outputs 25 and 26 of FIG. 8B stand for 10 and 11 of FIG. 1. The insets of FIGS. 8A and 8B show two different cases of applications for using the nonlinear optical medium 9 of FIG. 1 as a passive or active apparatus of the present invention by using $\omega_1$ and $\omega_2$ of FIG. 2 as the input 5 of FIG. 1, respectively. Important note is mentioned for the frequency conversion. For the frequency invariance, $\delta_1$ of FIG. 2 must satisfy the following condition so that the frequency of two outputs 10 and 11 of FIG. 1, or 22 and 23 of FIG. 8A, or 25 and 26 of FIG. 8B are equal: $\delta_1 = \omega_{ba}$, where $\omega_{ba} = \omega_b - \omega_a$.

For the third application of the present invention, an apparatus of a wavelength converter is presented. For the application of the wavelength converter, however, the detuning of $\omega_1$ of FIG. 2 should be set $\delta_1 \neq \omega_{ba}$. This means that the output frequency of 10 and 11 of FIG. 1, or 22 and 23 of FIG. 8A, or 25 and 26 of FIG. 8B should not be same each other. Therefore, the input laser 16 of FIG. 8A or FIG. 8B as 5 of FIG. 1 should not be same as that of the output 23 of FIG. 8A or 26 of FIG. 8B as 11 of FIG. 1. If the input laser 16 of FIG. 8A or FIG. 8B as 5 of FIG. 1 is resonant to the optical transition from $|a\rangle$ to $|d\rangle$ of FIG. 2, then the input laser should be routed into the direction of output 22 of FIG. 8A or 25 of FIG. 8B as 10 of FIG. 1 without experiencing any frequency change. However, if the input laser 16 of FIG. 8A or FIG. 8B as 5 of FIG. 1 is not resonant to the optical transition from $|a\rangle$ to $|d\rangle$ of FIG. 2, then the input laser 16 should be routed into the direction of output 23 of FIG. 8A or 26 of FIG. 8B as 11 of FIG. 1, experiencing frequency change by that amount of $|\delta_1 - \omega_{ba}|$.

While the present invention has been described with respect to certain preferred embodiments only, other modifications and variation may be made without departing from the spirit and scope of the present invention as set forth in the following claims.

What is claimed is:

1. A method of quantum switching using a nonlinear optical medium composing three closely spaced ground states $|a\rangle$, $|b\rangle$ and $|c\rangle$ such that the transition among the ground states is dipole forbidden, and an excited state $|d\rangle$ such that the two-photon transitions between the ground state $|a\rangle$ and the $|c\rangle$, the $|b\rangle$ and the $|c\rangle$, and the $|a\rangle$ and the $|b\rangle$ via the excited state $|d\rangle$ are allowed, the method comprising following steps:

a) applying a first laser beam to the nonlinear optical medium as an input beam through an optical fiber, waveguide, or free space at a frequency of $\omega_1$ corresponding to a first transition between the ground state $|a\rangle$ and the excited state $|d\rangle$;

b) applying a second laser beam to the nonlinear optical medium through an optical fiber, waveguide, or free space at a frequency of $\omega_2$ corresponding to a second transition between the ground state $|b\rangle$ and the excited state $|d\rangle$;

c) applying a third laser beam to the nonlinear optical medium through an optical fiber, waveguide, or free space at a frequency of $\omega_3$ corresponding to a third transition between the ground state $|c\rangle$ and the excited state $|d\rangle$;

d) adjusting the intensities of the first laser beam $\omega_1$, the second laser beam $\omega_2$, and the third laser beam $\omega_3$ to produce a strongly driven superposition state composed of the ground state $|a\rangle$ and the $|c\rangle$ creating two-photon coherence induction $\text{Rep}_{ac}$;

e) adjusting the frequency of the first laser beam $\omega_1$ to produce a strongly driven superposition state composed of the ground state $|b\rangle$ and the $|c\rangle$ creating two-photon coherence induction $\text{Rep}_{bc}$, whereas making the two-photon coherence induction $\text{Rep}_{ac}$ suppressed;

f) applying a fourth laser beam $\omega_p$ through an optical fiber or a free space corresponding to a fourth transition between the ground state $|c\rangle$ and the excited state $|d\rangle$ for nondegenerate four-wave mixing or phase conjugation geometry with either the first laser beam $\omega_1$, the $\omega_3$, and the $\omega_p$ to produce nondegenerate four-wave mixing signal $\omega_{1d}$, or the second laser beam $\omega_2$, the $\omega_3$, and the $\omega_p$ to produce nondegenerate four-wave mixing signal $\omega_{2d}$; and g) connecting the nondegenerate four-wave mixing signals $\omega_{1d}$ and the $\omega_{2d}$ to optical fibers physically separated.

2. The method of claim 1, wherein the excited state $|d\rangle$ is selected such that its energy level is higher than the energy level of the ground state $|a\rangle$, the $|b\rangle$, and the $|c\rangle$.

3. The method of claim 1, wherein the ground state $|b\rangle$ is selected such that its energy level is higher than the energy level of the ground state $|a\rangle$.

4. The method of claim 1, wherein Rabi frequency $\Omega_1$ of the first laser beam $\omega_1$ is greater than that of the second laser beam $\omega_2$, and the third laser beam $\omega_3$.

5. The method of claim 1, wherein the first laser beam $\omega_1$, the second laser beam $\omega_2$, the third laser beam $\omega_3$, and the fourth laser beam $\omega_p$ are synchronized satisfying the laser beams $\omega_1$, $\omega_2$, and $\omega_3$ are overlapped one another temporally, and the fourth laser beam $\omega_p$ is time delayed by $\tau$ shorter than phase decay time T2 among the three ground states $|a\rangle$, $|b\rangle$, and $|c\rangle$.

6. The method of claim 1, wherein the detuning $\delta_1$ of the first laser beam $\omega_1$ is the same as the frequency difference between the ground state $|a\rangle$ and the $|b\rangle$, but greater than the Rabi frequency of the first laser beam $\omega_1$ for the applications of optical router of the quantum switch.

7. The method of claim 6, wherein the second laser beam $\omega_2$ acts as an input beam to be switched, and the first laser beam $\omega_1$ acts as a control beam by adjusting detuning $\delta_1$ to switch the input beam, and the third laser beam $\omega_3$, and the fourth laser beam $\omega_p$ are synchronized with the control beam $\omega_1$.

8. The method of claim 1, wherein the detuning $\delta_1$ of the first laser beam $\omega_1$ is the same as the frequency difference between the ground state $|a\rangle$ and the $|b\rangle$, but greater than the Rabi frequency $\Omega_1$ of the first laser beam $\omega_1$ for the applications of optical demultiplexer of the quantum switch.

9. The method of claim 8, wherein the first laser beam $\omega_1$ acts as an input beam to be switched by adjusting the detaining $\delta_1$ of the input beam, and the second laser beam $\omega_2$ the third laser beam $\omega_3$ and the fourth laser beam $\omega_p$ are synchronized with the input beam $\omega_1$.

10. The method of claim 1, wherein the detuning $\delta_1$ of the first laser beam $\omega_1$ is not the same as the frequency difference between the ground state $|a\rangle$ and the $|b\rangle$, but greater than the Rabi frequency of the first laser beam $\omega_1$ for the applications of optical wavelength converter.

11. The method of claim 10 wherein the first laser beam $\omega_1$ acts as input beam to be switched by adjusting detuning $\delta_1$ of the input beam, and the second laser beam $\omega_2$ and the third laser beam $\omega_3$ and the fourth laser beam $\omega_p$ are synchronized with the input beam $\omega_p$.

12. An apparatus for a quantum switch using a nonlinear optical medium composing three ground states $|a\rangle$, $|b\rangle$, $|c\rangle$ such that the transition between the ground states $|a\rangle$ and $|b\rangle$, $|a\rangle$ and $|c\rangle$, and $|b\rangle$ and $|c\rangle$ are dipole forbidden, and an excited state $|d\rangle$ such that two-photon transition between the ground states $|a\rangle$ and $|b\rangle$, $|a\rangle$ and $|c\rangle$, and $|b\rangle$ and $|c\rangle$ via the excited state $|a\rangle$ is allowed, the apparatus comprising:

a) an input beam source for applying to the nonlinear optical medium the input beam at a frequency of $\omega_1$ corresponding to a first transition between the ground state $|a\rangle$ and the excited state $|d\rangle$;

b) a second laser beam source for applying to the nonlinear optical medium a second beam at a frequency of $\omega_2$ corresponding to a second transition between the ground state $|b\rangle$ and the excited state $|d\rangle$;

c) a third laser beam source for applying to the nonlinear optical medium a third beam at a frequency of $\omega_3$ corresponding to a third transition between the ground state $|c\rangle$ and the excited state $|d\rangle$;

d) means fox splitting a fourth laser beam from the third laser beam for applying to the nonlinear optical medium the fourth beam at a frequency of $\omega_p$ corresponding to a fourth transition between the ground state |c> and the excited state |d>; and e) means for adjusting the intensities and the frequencies of the first beam, the second beam, the third beam, and the fourth beam to produce coherent superposition state of the ground state |a>, |b>, and the |b> and |c>.

13. The apparatus of claim 12, wherein the nonlinear optical medium is a solid.

14. The apparatus of claim 12, wherein the nonlinear optical medium is a multiply coupled semiconductor.

15. The apparatus of claim 14, wherein the three ground states |a>, |b> and |c>, and the excited state |d> are selected in conduction band of the multiply coupled semiconductor.

16. The apparatus of claim 12, wherein the second laser beam source and the third laser beam source deliver single-mode beams.

17. A method for implementing a quantum switch, comprising the steps of:

applying a plurality of light beams to a nonlinear optical medium, each of the light beams having a frequency corresponding to one of transition frequencies of the nonlinear optical medium; and inputting a pumping light beam to produce nondegenerate multi-wave mixing signals based on a dark resonance, wherein the pumping light beam has a frequency corresponding to a transition between an excited state and one of the ground states.

18. An optical device, comprising:

a nonlinear optical medium including a number of energy levels;

a light source for inputting a plurality of lights to the nonlinear optical medium, each of the lights having a frequency corresponding to one of transition frequencies of the nonlinear optical medium; and a pumping source for inputting a pumping light into the nonlinear optical medium, whereby the pumping light produces nondegenerate multi-wave mixing signals based on a dark resonance.

19. The optical device of claim 18, wherein the pumping light has a frequency corresponding to a transition between an excited state and one of the ground states of the nonlinear optical medium.

20. The optical device of claim 19, further comprising means for adjusting the intensities of the plurality of lights.

* * * * *